United States Patent
Conner et al.

[19]

[11] Patent Number: 6,024,445
[45] Date of Patent: Feb. 15, 2000

[54] SINGLE POINT ATTACHMENT OF BRIDGE AND TEMPLES TO EYEGLASS LENSES

[75] Inventors: William A. Conner; Brian N. Conner, both of San Diego; Daniel S. Kline, Encinitas, all of Calif.

[73] Assignee: Microvision Optical, Inc., San Diego, Calif.

[21] Appl. No.: 09/185,847

[22] Filed: Nov. 4, 1998

[51] Int. Cl.⁷ ..................................................... G02C 1/04
[52] U.S. Cl. .............................................................. 351/110
[58] Field of Search ......................................... 351/110, 41

[56] References Cited

U.S. PATENT DOCUMENTS 5,585,870  12/1996  Masunaga ................................. 351/110
5,835,183  11/1998  Murai et al. ............................. 351/110

*Primary Examiner*—Hung Xuan Dang
*Assistant Examiner*—Traleeta Flowers
*Attorney, Agent, or Firm*—Frank D. Gilliam

[57] ABSTRACT

Attachment of a bridge and temple hinge to the lens of rimless eye glasses. The attachment is accomplished by providing a tapered aperture is each lens adjacent to the outer surface of the lens and conforming the distal ends of the bridge and temple hinge to conform to the taper of the aperture. This combination provides a friction lock between the aperture and the bridge and temple hinge. The taper can be in the range of 1 to 20 degrees either convergent from the front to the back of the lens or divergent from the front to the back of the lens. Ideally a taper of 4.5 degrees is preferable. The taper can take the form of a cylinder, rectangular or triangular. The distal ends of the bridge and temple hinge can be inserted either from the front of the lens toward the back or from the back toward the front. The distal ends of the temple hinge can be inserted directly into the aperture or can be bent formed to provide a bias between the outer surface of the lens adjacent the aperture for non-rotational support. In some applications a notch is provided at the outer lens surface and the bent formed portion of the temple hinge is nested therein for additional mechanical support and to increase the resistance of relative rotation of the bridge or temple hinge.

12 Claims, 4 Drawing Sheets

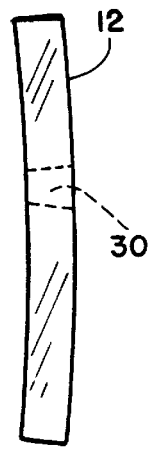
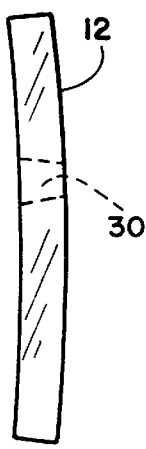
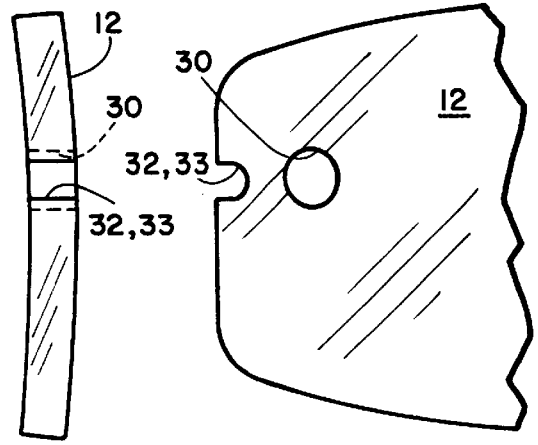
FIGURE 19  FIGURE 20  FIGURE 21  FIGURE 18
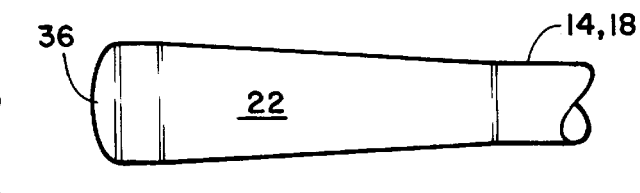
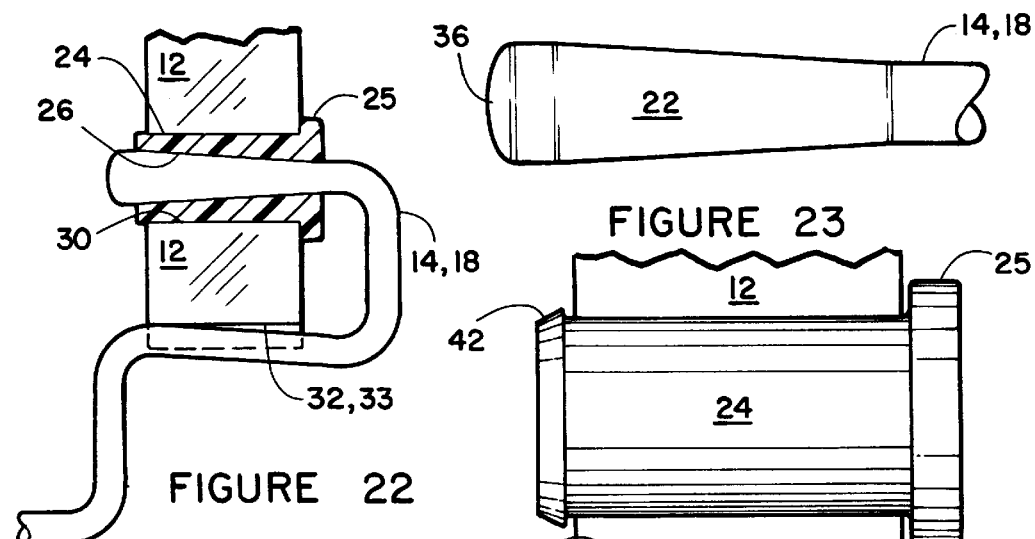
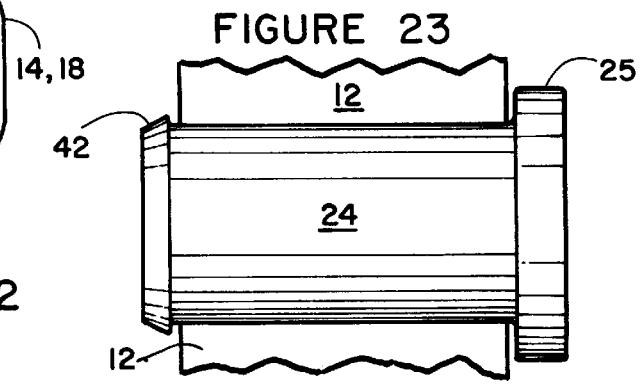
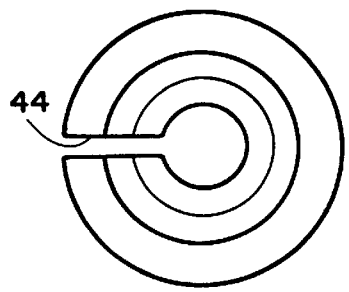
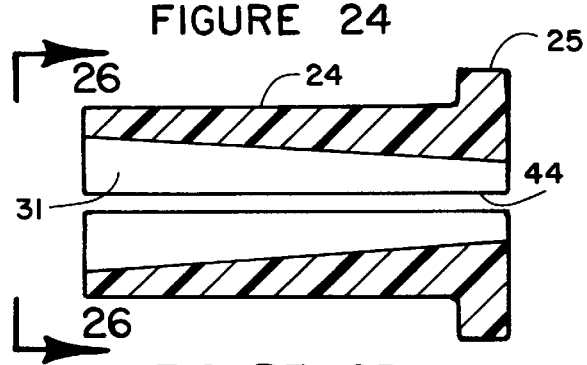
FIGURE 26

SINGLE POINT ATTACHMENT OF BRIDGE AND TEMPLES TO EYEGLASS LENSES

BACKGROUND OF THE INVENTION

The invention is directed to rimless eye glasses and more specifically to means for fixedly attaching temples and bridges directly to the lens of the eye glasses.

U.S. Pat. No. 4,550,898 issued to Hafner teaches the use of clamps and screws to attached the bridge and temple hinges to the lens of rimless eye glasses.

U.S. Pat. No. 5,073,020 issued to Lindberg et al. teaches elongated slits for attaching the bridge and temple's hinges by a "U" shaped bent wire loop portions having a resilient expansion force (tension) on the outside surfaces of the "U" shaped loop for maintaining the loops and associated bridge or temple hinge connection to the lens. There is a disadvantage to this type of connections in that it can be easily disengaged from the lens as there is no locking mechanism to prevent up and down motion on the bridge and temples from loosening or disengaging the wire to lens connection.

U.S. Pat. No. 5,450,141 issued to Kobayashi teaches temple hinge and nose piece attachment to rimless glasses by means of bolts passing through the lens and nuts holding them in place.

U.S. Pat. No. 5,585,870 issued to Masunaga teaches bridge and temple hinge connections to the lens of rimless eye glasses by a round wire formed bridge and temple hinge connected at three points on the lens of rimless glasses. The connections for bridge and temple teaches a hinge are made with a "U" shaped wire biased against the lens edge by tension provided by the distal end of the wire inserted into an aperture in the lens. The distal ends of the inserted wires have a buffer sleeve for maintaining the wire end in the aperture. Even the improvement of the sleeve over the distal end of the inserted wire there is a tendency for the wire to loosen and become dislodged from the lens and render the eye glasses useless for the purpose intended.

U.S. Pat. No. 5,646,706 issued to Izumitani teaches rimless eye glasses with apertures through the narrow vertically sides of the lens and with protrusions extending from the bridge and temple inserted into the apertures and adhered thereto by adhesive means.

U.S. Pat. No. 5,748,280 issued to Herman teaches a plurality of apertures through the lens of rimless glasses. Separate pairs of apertures are used to attach the temple and two pairs of apertures are used to attach the bridges.

There is a continuing need to improve the bridge and temple or temple hinge attachment to the lens of rimless eye glasses keeping in mind lightening the overall weight of the eye glasses while providing a snug fit that cannot be inadvertently become loosened or disengaged from the lens connection. The preferred embodiments of the instant invention proved an advancement in this art.

SUMMARY OF THE INVENTION

The invention is directed to rimless eye glasses, and more specifically to the connection of bridges and temple hinges to rimless eye glasses. This invention teaches and claims the temple hinge and the bridge being directly attached within an aperture through the lens and in one embodiment the bridge and temple hinge are additionally supported by a notch in both sides of each lens wherein the temple hinge and one side of the bridge form a friction grip or clamp between the aperture and notch that prevents rotational movement and accidental dislodgement of the bridge and/or temple hinge from the lens.

The distal tip of the temple hinge and bridge and the apertures in the eye glass lens can take many different mating forms including frusto conic, rectangular and triangular. Obviously the distal tips and the apertures take substantially the same cross sectional mating shape. With these forms the bridge and temple hinges and lenses are either prevented or resistive to relative rotation between the distal tips and lens aperture.

In another embodiment, a spacer or shim of resilient material is positioned between the aperture and the distal ends of the bridge and temple hinge for providing a positive lock between the aperture and the distal inserted ends of the noise piece and the temple hinge. The aperture through the shim or spacer is shaped to conform to the shape of the distal tip of the bridge and the lens aperture, i.e., the aperture through the bushing is either frusto conic, rectangular or triangular to conform with the distal ends of the bridge and temple.

In another embodiment the bushing is split to accommodate the insertion of the distal tip of the bridge or temple hinge into the lens aperture. In this embodiment the bushing stays attached to the distal end of the bridge and temple hinge when removed therefrom.

The bridge and temple hinge can be attached to the lens through either surface of the lens, i.e., front or back surfaces, and can be only one aperture connection or can be formed to provide a biasing force between an aperture and the outer edge of the lens surface.

In another embodiment the side support includes a notch that further resists rotation of the bridge or temple hinges when inserted within the lens aperture.

The invention as disclosed in this application provides an improvement to rimless eye glasses by providing more positive and secure connection between the lens and bridge and temple hinge and reduces the over all weight of the eye glasses.

The principal object of this invention is to provide a light weight pair of rimless eye glasses.

Another object of this invention is to provide a positive lock connection between the eye glass lens and attached nosepiece and temple hinge.

The above and other objects, features and advantages of the present invention will become apparent from the following descriptions when taken in conjunction with the accompanying drawings that illustrate preferred embodiments of the present invention by way of example.

BRIEF DESCRIPTION OF THE DRAWING FIGURES

FIG. 18 is a partial showing of an eye glass lens showing the relative positions of the aperture and notch;

FIGS. 19–21 depicts cutaway side views of a first, second and third apertures through lens configurations;

FIG. 22 is a cutaway side showing of a third embodiment of bridge and temple hinge to lens attachment;

FIG. 23 is a side detail showing of the distal end or tip of the bridge and temple hinge as shown in FIGS. 11 and 21;

FIG. 24 is a third embodiment of the bushing;

FIG. 25 is a cutaway showing of a fourth embodiment of the bushing;

FIG. 26 is an end view taken along line 26—26 of FIG. 2; and

DETAILED DESCRIPTION OF THE PREFERRED EMBODIMENTS

Figure 1:
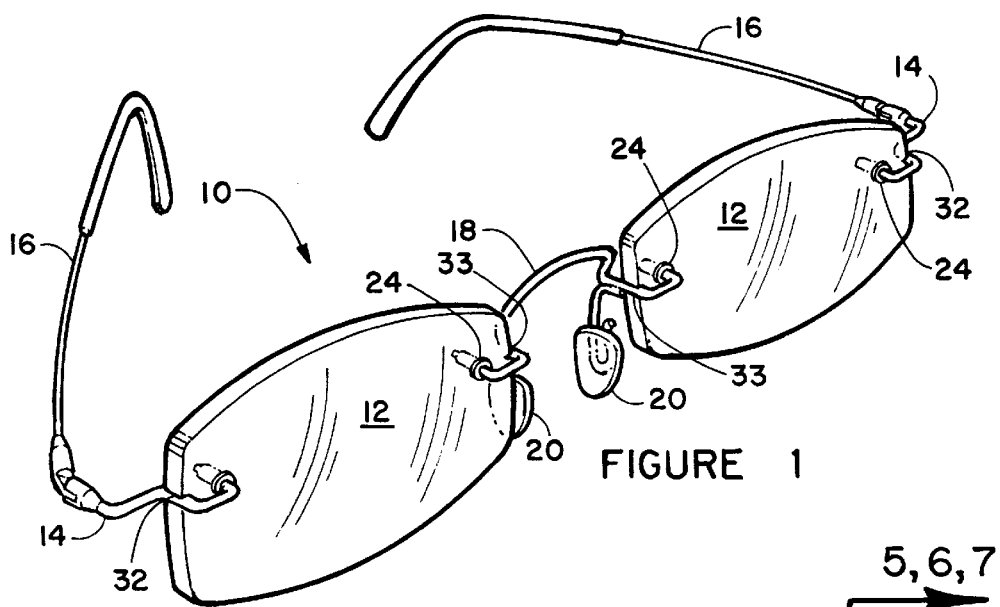
FIG. 1 is a perspective showing of a first embodiment of the invention employed on conventional rimless eye glasses with bridge and temple hinge attached through the inner surface of the eye glass lens.

Referring now to drawing FIGS. 1–7, FIG. 1 depicts a perspective showing of one embodiment of the invention in combination with a pair of rimless eye glasses 10. The eye glasses include lens 12 having a front surface toward the right-hand side of the drawing Figures and the back of the lens is at the left of the drawing figures, temple hinges 14, temples 16, bridge 18 and nose pieces 20. The bridge, temple hinge and temple may be constructed of any suitable material either plastic or metal with beta titanium being preferable. The nose pieces can be constructed of any suitable material with a soft pliable material being preferable.

Figure 2:
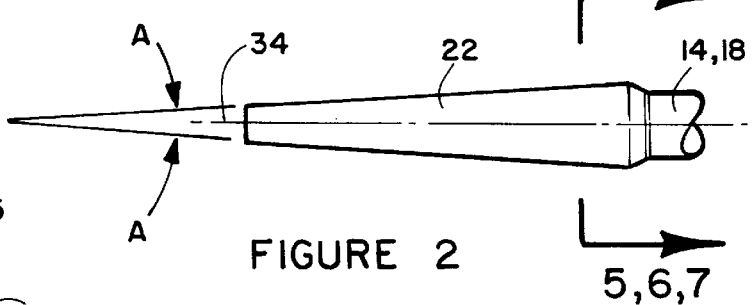
FIG. 2 is a side cutaway view showing a first embodiment of a distal or tip lens aperture insertion/attachment end of the noise piece and temple hinge.

Referring now specifically to drawing FIG. 2, this Figure represents a side view if the distal end or tip 22 of both the bridge 18 and temple hinge 14. The distal end or tip 22 is either formed on the distal ends of the bridge and temple hinge or separately formed and slipped over the distal end or tip end of the material forming the bridge 18 and temple hinge 14 and is fixedly attached thereto by any suitable method such as, but not limited to, soldering, welding adhering or the like.

Figure 4:
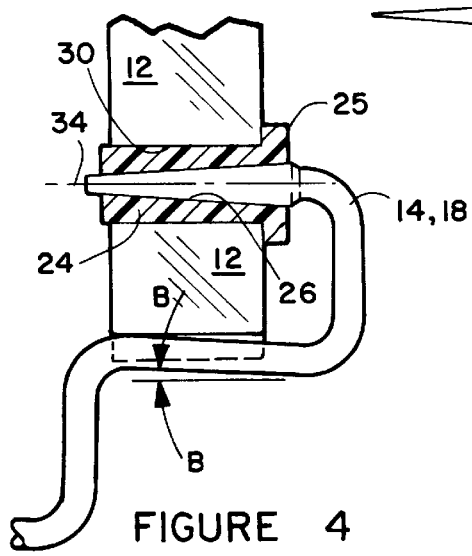
FIG. 4 is a side cutaway showing of the distal end or tip of the temple hinge and bushing of FIGS. 2 and 3 inserted into a lens aperture for securement thereto.
Figure 3:
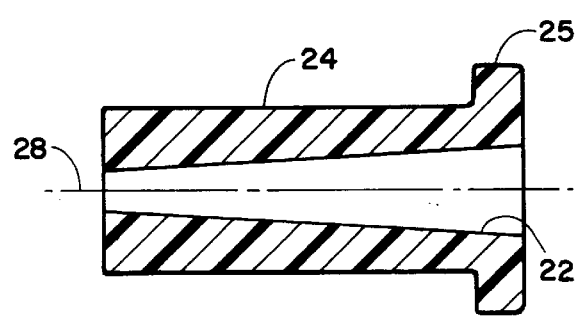
FIG. 3 is a side cutaway view showing of a first embodiment of a bushing of the invention for placement between a bridge and temple hinge lens aperture and the distal or tip insertion end of the noise piece and temple hinge for attachment to the lens.
Figure 5:
FIGS. 5–7 depicts various cross sectional configurations of the distal or tip of the bridge and temple hinge attachment to the lens.
Figure 6:
Figure 7:

The cross-section of the aperture, distal end or tip of the bridge and temple hinge may divergent or convergent and take a number of different configurations such as those shown in drawing FIGS. 5–7. As shown in the drawing FIG. 2 configuration that can be any one of the configurations shown in drawing FIGS. 5–7, the taper angle "A" of either converging or diverging toward the tip may vary in a range of slope angles from 1 degree to 45 degrees along the length of the tip 22. Drawing FIG. 3 depicts a cutaway side view showing of a first embodiment of a bushing 24 with a channel 26 through the center axes 28 and a flange or protrusion 25. The channel 26 may be configured substantially the same as the tip 22 or either one may have different convergent or divergent slope angle "A" then the other. The sleeve shim 24 can be constructed of any material suitable for the purpose intended. Like the nose pieces 20, the bushing can be constructed of a formable material such as, by way of example and not intended as a limitation thereto, plastic, natural rubber, gum rubber or the like suitable for the purpose intended. Referring again to drawing FIG. 4, there is depicted a partial side cutaway showing of the tip 22 and bushing 24 inserted into the apertures 30 and 31 through the front of lens 12 with the flange or protrusion 25 positioned against the lens surface. The cross-section of the apertures through the lens 12 in this embodiment may take any one of the various shapes shown in drawing FIGS. 5–7, as fore mentioned, and the cross sectional shape as the channel 26 through the bushing and configuration of the tip 22 may be alike or have relative different convergent or divergent slope angles. Again referring to drawing FIG. 4, the slots 32 and 33 at each edge of each lens receive a portion of the bridge or temple hinge therein. The center line 34 of the tip 22 is not parallel with the portion of the temple hinge engaging the slot 32 and similarly the nose piece between nose piece 18 and slot 33 have the same configuration as between 34 and the portion of 14 within the slot 32. The temple hinge portion engaging the slot is formed inward toward the center line 34 if the tip 22 forming an angle "B". This angle at "B" act to clamp the temple hinge portion in the slot toward the lens and centerline 34 of the tip 22 biasing the tip and the temple hinge portion in the slot toward each other by that preventing up and down or side movement of the temple hinge or bridge relative to the lens.

Figure 8:
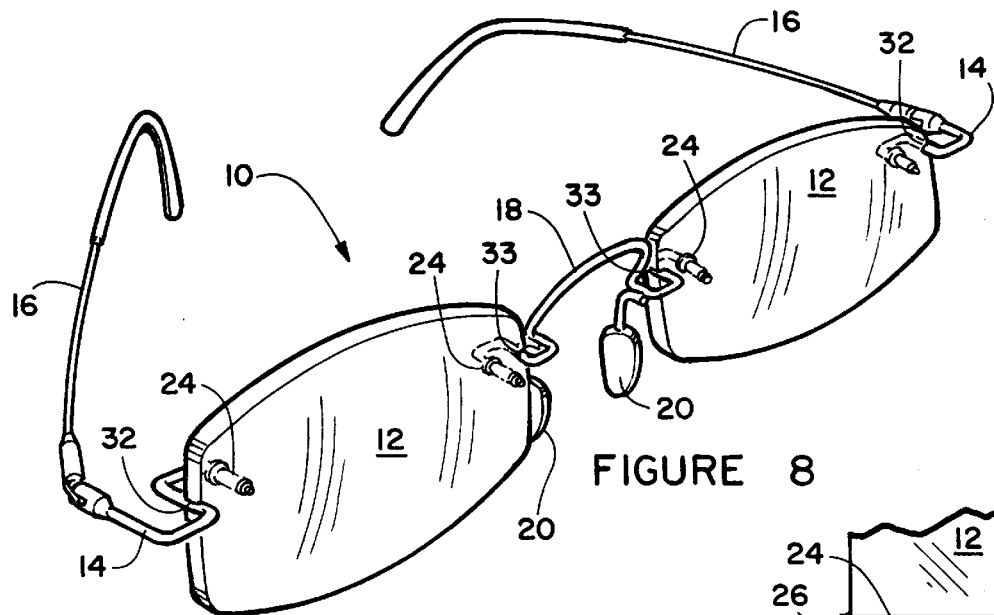
FIG. 8 is a perspective showing of a second embodiment of the invention employed on conventional rimless eye glasses with bridge and temple hinge attached through the outer surface of the eye glass lens.

Referring now specifically to drawing FIG. 8, the showing in this Figure is similar to the showing and discussion of drawing FIG. 1 above except that the distal ends of the bridge and temple hinges are inserted into the aperture 30 from the rear of the lens toward the front of the lens rather than from the front of the lens toward the rear of the lens. The insertion from the rear of the lens toward the front of the lens requires an "S" form at the distal end of the temple hinge rather than a "U" form at the distal end shown in drawing FIG. 1.

Figure 9:
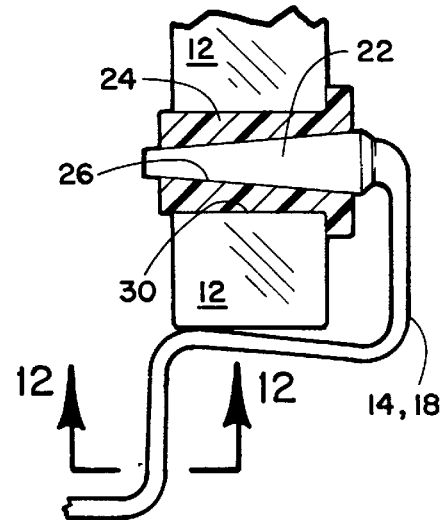
FIG. 9 is a cutaway side view showing similar to the showing of FIG. 4 as related to the outer attachment of the bridge and temple hinge of FIG. 8.

Referring now specifically to drawing FIG. 9, this Figure depicts a sectional cross-sectional detail of the bridge and temple hinge attachment to the lens as depicted in drawing FIG. 4 except that there is no notch at the outer lens surface and the bridge and temple hinge are biased between the outer lens surface and the aperture 30. The bias is provide in the same manner as previously discussed above in the description of drawing FIG. 4.

Figure 10:
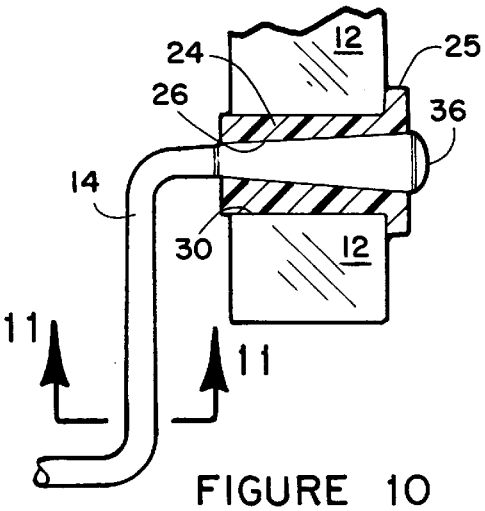
FIG. 10 is a second embodiment similar to the FIG. 4 showing with the bridge and temple hinge distal end or tip inserted into a lens aperture from the back of the lens with the bushing inserted from the front of the lens.

Referring specifically to drawing FIG. 10, this figure is similar to drawing FIG. 9 except that the distal end of the bridge 18 and temple hinge 14 is attached to the aperture through the lens only and have no bias support at the lens edge. Also, the distal ends of the bridge and temple hinges are tapered divergently toward the front of the lens 12 rather than convergently toward the front of the lens with the bushing 24 inserted from the front of the lens and has a curvilinear end surface 36.

Figure 11:
FIG. 11 is a showing taken along line 11—11 of FIG. 10.

FIG. 11 depicts the cross-sectional configuration of the bridge and temple hinge cross-section at line 11—11 of FIG. 10.

Figure 12:
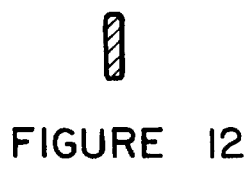
FIG. 12 is a showing taken along line 12—12 of FIG. 9.

FIG. 12 depicts the cross-sectional configuration of the bridge and temple hinge cross-section at line 12—12 of FIG. 9.

Figure 13:
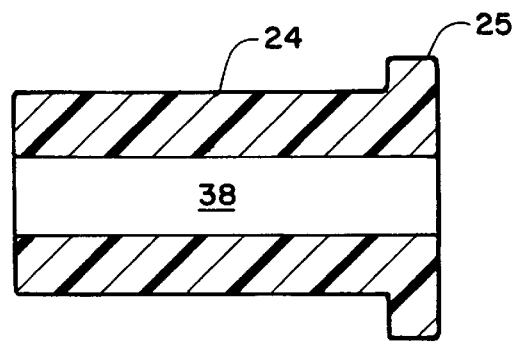
FIG. 13 is a second embodiment of the bushing.

FIG. 13 is a second embodiment of the bushing 24 having a non tapered aperture 38 through the longitudinal center line.

Figure 14:
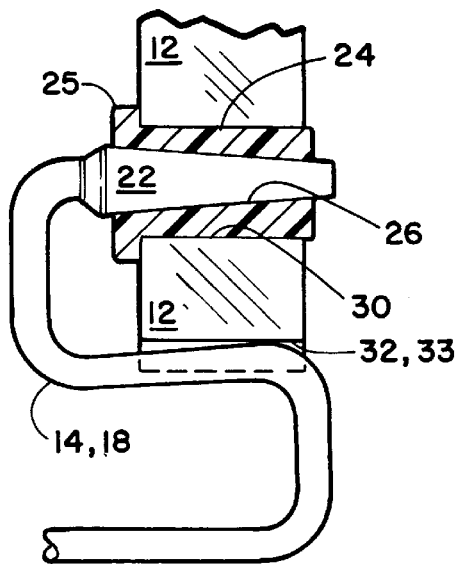
FIG. 14 is a detailed cutaway detail of the bridge and temple hinge attachment of FIG. 8.

FIG. 14 is a cutaway cross sectional detail showing of the bridge 18 and temple hinge 14 to lens connection for FIG. 8.

Figure 15:
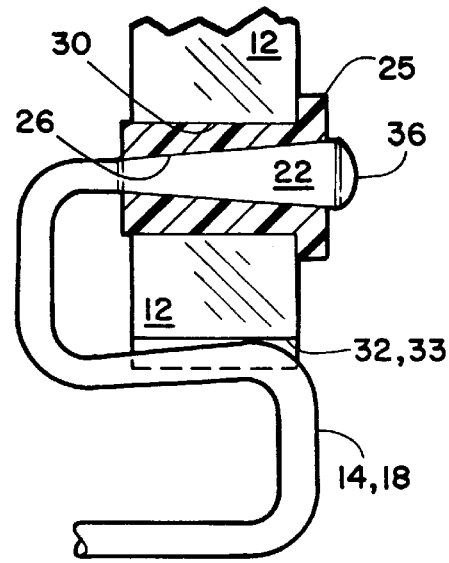
FIG. 15 is a cutaway showing similar to FIG. 10 with an "S" bend in the temple hinge attachment to provide additional lens side notch support.

FIG. 15 is a showing of a back lens 12 connection with the "S" configured bends in the distal ends of the bridge 18 and the temple hinge connected to the lens in the same manner as that shown in drawing FIG. 10.

Figure 16:
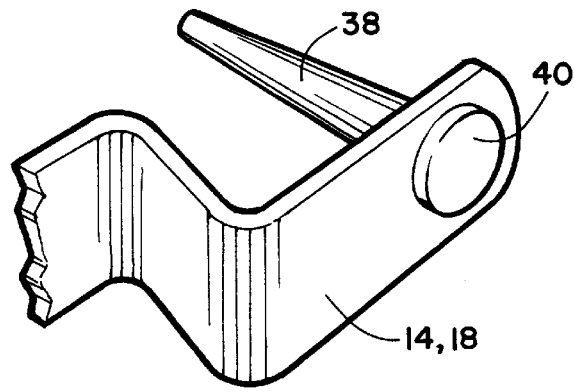
FIG. 16 is a perspective showing of a second embodiment of a bridge and temple hinge to lens attachment.

FIG. 16 is a perspective showing of the distal ends of the bridge and temple hinge formed from flat material with a distal end or tip 38 swedged or otherwise fixedly attached to the distal end of the bridge and temple hinge through in an aperture 40.

Figure 17:
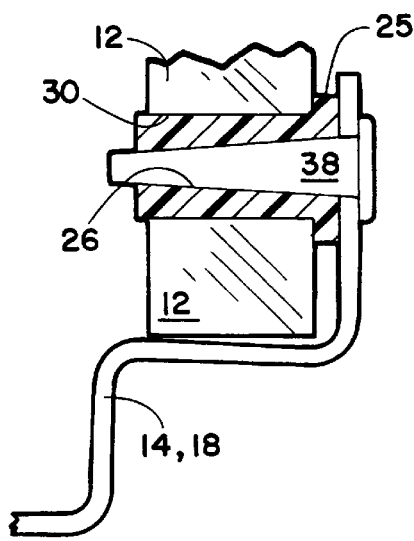
FIG. 17 is a cutaway showing similar to FIG. 15 except the bridge and temple hinge and bushing are mounted through the front of the lens.

FIG. 17 is similar to the FIG. 16 showing with the connections installed through the front of a lens 12 in an aperture 26 of bushing 24 as herein before discussed.

FIG. 18 is a section of a lens 12 showing the position relationship of notch 32, notch 33 (not shown in this Figure) being on the opposite side of the lens and the aperture 30.

FIGS. 19–21 depicts different configured apertures 30 through the lens 12. FIG. 19 depicts an aperture converging from the front surface toward the rear surface of the lens 12. FIG. 20 depicts an aperture diverging from the front surface toward the rear surface of the lens 12. FIG. 21 depicts an aperture that is the same cross-sectional configuration from the front surface toward the rear surface of the lens 12.

FIG. 22 depicts a cross-sectional showing of a second embodiment of a lens front inserted bridge and temple hinge connection with the aperture 30 and the distal ends or tips being divergent from the front toward the rear surface of the lens 12.

FIG. 23 depicts a detail showing of the bridge and temple hinge distal ends or tips as shown in drawing FIGS. 10 and 22.

FIG. 24 depicts a third embodiment of the bushing 24 having a locking flange 42 that when installed within aperture 30 of the lens is locked into the lens between protrusion 25 and flange 42. This bushing 24 can have any configured mating aperture 26 therethrough.

FIG. 25 depicts a fourth embodiment of the bushing 24 having a divergent aperture 31 therethrough from the protrusion 25 toward the flange 42. A slit 44 along the sleeve allows for expansion when inserted and compressing when removed.

FIG. 26 is an end view showing taken along line 26—26 showing the slit 44; and

Figure 27:
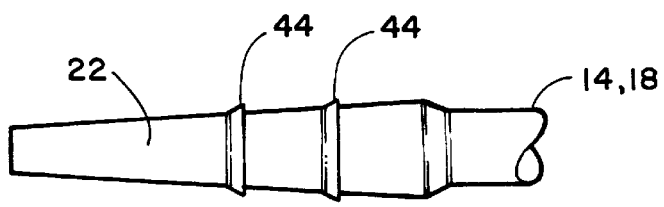
FIG. 27 is a side detail showing of the distal end or tip of the bridge and temple hinge having locking ribs.

FIG. 27 shows a bridge or temple hinge tip 22 that includes a plurality of locking ribs 44 that have an angled slope on one surface and a right angle surface opposite thereto for allowing easily insertion into the bushing 24 when inserted angled slope surface first and resistive to removal after inserted. The ribs also provide some expansion force between the end 22, bushing 24 and aperture 30 increasing locking forces therebetween.

It should be understood that although the explanation of the invention has been directed to rimless eye glasses it should be understood that the invention can be employed in rimed eye glasses where either the bridge or temple hinge is attached directly to the lens rather than the rim.

The foregoing is considered as illustrative only of the principles of the present invention. Further, since numerous modifications and changes will readily occur to those skilled in the art, it is not intended to limit the invention to the exact construction and applications shown and described, and accordingly, all suitable modifications and equivalents may be regarded as falling within the scope of the invention in the appended claims and their equivalent.

We claim:

1. An improved attachment means for attaching the temple hinges and bridge directly to the lenses of eye glasses comprising:

two cylindrical apertures through each of said lenses;

a cylindrical bushing having a tapered bore therethrough formed from resilient material for insertion into each of said cylindrical apertures through said lens;

said bridge and temple hinge formed with their distal ends being tapered substantially conforming to the tapered bore through said bushing and having at least one locking rib along the surface thereof, said at least one locking rib having an angled slope on one surface and a right angled surface opposite thereto, said distal ends being easily insertable, slope first, into said bushing and resistive to removal therefrom, when said distal ends of said bridge and temple hinge are inserted within said tapered bore of said bushing installed in said lens aperture thereby establishing a frictional locking attachment of the temple hinge ends and bushing within said aperture occurs.

2. The invention as defined in claim 1 wherein said aperture and said distal ends have a cylindrical taper between their ends.

3. The invention as defined in claim 1 wherein said aperture and said distal ends have a rectangular cross-sectional taper between their ends.

4. The invention as defined in claim 3 wherein said rectangular cross-sectional taper is square.

5. The invention as defined in claim 1 wherein said aperture and said distal ends have a triangular cross-sectional taper between their ends.

6. The invention as defined in claim 1 wherein said bridge and temple hinge distal ends are cylindrical in cross-section.

7. The invention as defined in claim 1 wherein said bridge and temple hinge distal ends are rectangular in cross-section.

8. The invention as defined in claim 1 wherein said lens has a front and a back surface and said bushing being directed from the back of said lens toward said front.

9. The invention as defined in claim 1 wherein said bushing has a first and second end surfaces and a first end surface includes a protrusion.

10. The invention as defined in claim 1 wherein said bushing has a longitudinal split through a side surface.

11. The invention as defined in claim 1 wherein the degree of taper between said distal ends of the bridge and temple hinge is selected from a taper range of from 1 to 45 degrees along the length of said distal ends.

12. The invention as defined in claim 1 wherein said at least one locking rib comprises a plurality of locking ribs.

* * * * *